United States Patent [19]

Wayman et al.

[11] 3,710,602
[45] Jan. 16, 1973

[54] HYDRAULIC TRANSMISSION
[75] Inventors: Robert W. Wayman, Bloomfield Hills, Mich.; Howard C. Wiemer, Muncie, Ind.
[73] Assignee: Borg-Warner Corporation, Chicago, Ill.
[22] Filed: May 24, 1971
[21] Appl. No.: 146,402

Related U.S. Application Data

[62] Division of Ser. No. 772,298, Oct. 31, 1968, Pat. No. 3,635,023.

[52] U.S. Cl. ............................................. 68/23.7
[51] Int. Cl. ........................ F16d 31/06, D06f 23/04
[58] Field of Search ........................ 68/23, 23.6, 23.7

[56] References Cited

UNITED STATES PATENTS 2,102,865  12/1937  Vickers .......................... 60/52
3,330,138  7/1967  Flinn ............................ 68/23
3,379,007  4/1968  Brundage ....................... 60/53 R
3,388,569  6/1968  Kurtz ........................... 68/23.7

*Primary Examiner*—William I. Price
*Attorney*—Donald W. Banner

[57] ABSTRACT

A hydraulic transmission for independently driving an agitator motor and a spin mechanism of an automatic washing machine with control mechanism for independently controlling the speed of each by using a manually adjustable rotary valve to establish the size of a variable size orifice in the fluid exhaust line from the agitator motor and the spin mechanism to control the speed of same. The rotary valves are positioned in a stationary portion of the transmission to provide for connection to the manual adjustment means.

9 Claims, 4 Drawing Figures

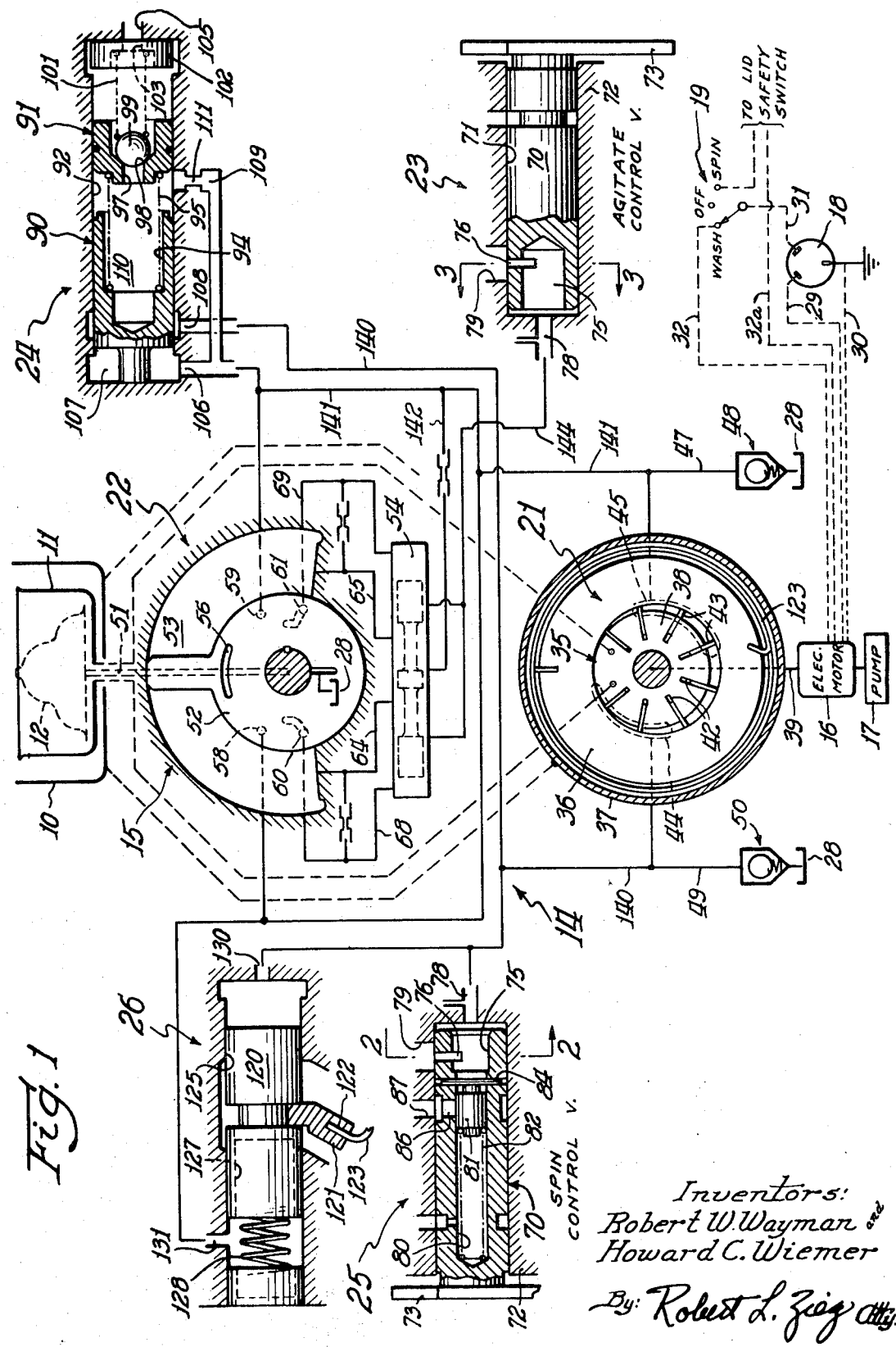

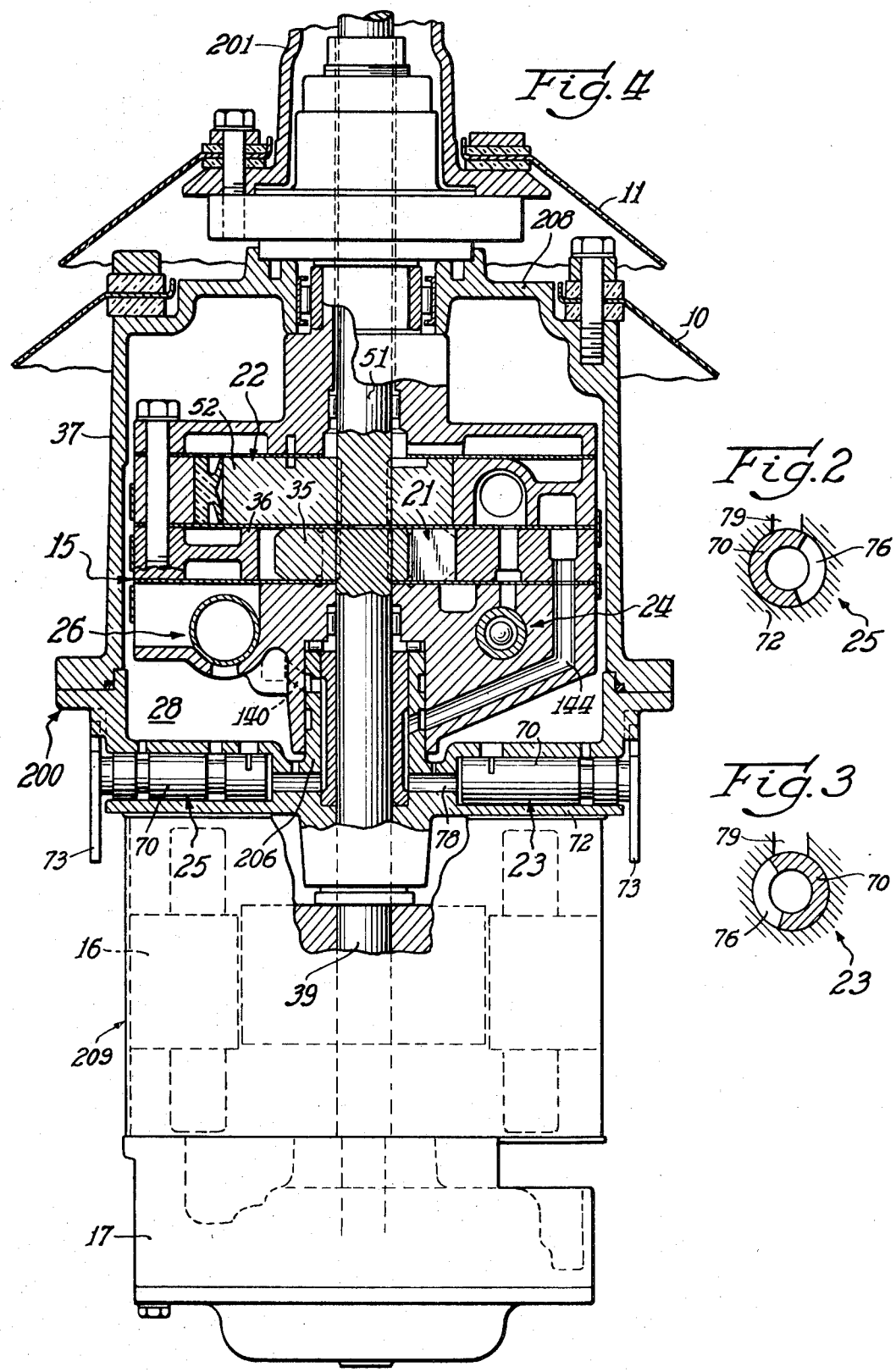

HYDRAULIC TRANSMISSION

The present application is a divisional application of Ser. No. 772,298, filed Oct. 31, 1968, now U.S. Pat. No. 3,635,023, entitled Hydraulic Transmission.

SUMMARY OF THE INVENTION

In known washing machine structures such as described in U.S. Pat. No. 3,330,138, issued 7/11/67, and copending application Ser. No. 671,675, filed 9/29/69, now U.S. Pat. No. 3,443,405 all of common assignee, speed control mechanisms are provided including means to establish a variable size orifice. As is common in the control of hydraulic motors, reciprocating valves are used to establish an orifice size to control the speed of the device.

The present invention incorporates rotary control valves in which a slot is provided between the center bore of a valve spool and an exhaust port so that by rotation of the valve an orifice size can be established. The rotary valves are advantageous in that a wide range of orifice sizes is provided and precise control can be obtained by means of the wide range of the orifice sizes available.

Further, in the construction of the present invention the components of the transmission mechanism are arranged in a stationary housing for a washing machine such that the rotary control valves are conveniently mounted in a section of the stationary case on opposite sides of the transmission. Thus the control of the valves is simplified as compared to known structures in that the valves are not in a rotating section of the transmission.

BRIEF DESCRIPTION OF THE DRAWINGS

FIG. 1 is a schematic view of a control system for a hydraulic transmission for a clothes washer embodying the principles of the invention;

FIG. 2 is a view taken along the lines 2—2 of FIG. 1;

FIG. 3 is a view taken along the lines 3—3 of FIG. 1; and

FIG. 4 is a cross-sectional view of the transmission in an actual washing machine installation.

DESCRIPTION OF THE PREFERRED EMBODIMENT

Referring to FIG. 1, a washing machine is schematically illustrated comprising a tub 10 adapted to hold a laundering fluid, a clothes container 11 and an oscillatable agitator 12. A hydraulic transmission 14 is schematically illustrated for independently driving the clothes basket 11 for effecting a centrifugal drying operation, herein referred to as the spin cycle, or the oscillatory agitator 12, herein referred to as the agitate cycle, of the automatic clothes washer. The transmission 14 includes a transmission inner housing generally designated as 15 within which most of the elements of the transmission are mounted. An electric motor 16 is provided having a water pump 17 driven thereby for recirculating water in the clothes container 11 of the automatic washer and a source of power 18 is illustrated for operating the motor 16. A cycle selector switch 19 is schematically illustrated in simplified form although in a washer installation this function would be performed by a timer switch mechanism of known construction.

The important elements of the hydraulic transmission are as follows: a constant volume reversible fluid pump 21, an oscillatory agitator motor 22, a rotary control valve 23 for the agitator motor, a bypass/relief valve 24 for the agitator motor, rotary control valve 25 to selectively restrict the output of the pump 21 and a spin brake actuator 26.

A fluid sump 28 is provided which is schematically illustrated for convenience at various places in the illustration of the invention, although in actual construction, one fluid sump 28 is provided into which all the exhaust connections for various elements of the transmission exhaust fluid pressure. Electric lead 29 and 30 interconnect the source of power 18 with the motor 16, the lead 30 being a ground line. Lead 31 connects the source of power 18 to switch mechanism 19. Switch mechanism 19 is connected to the motor by a lead 32 or a lead 32a.

The hydraulic pump 21 includes a pumping element 35 and a rotatable pump housing element 36 operative within a fixed case section 37.

Any of a number of well-known types of hydraulic pumps could adequately perform the functions of the hydraulic pump 21, as for example, the crescent type or the gerotor type, but for reasons that will later be described, it is found that the vane type pump will perform best in the present transmission. For this reason, the hydraulic pump 21 is illustrated as a vane pump.

The pumping element 35 consists of a rotor 38 connectible to a rotatable drive member 39 of the electric motor 16. The rotor 38 contains a series of radial slots 42. A plurality of vanes 43 is provided, each vane adapted to slide within a slot 42.

The rotatable pump housing element 36 consists of an annular disc mounted eccentric to the rotor 38 and is shown drivingly connected to the clothes container 11. A pair of arcuate ports 44 and 45 is formed in the pump housing element 36 for communicating fluid from the sump 28 to pump 21 and, after the fluid is pressurized, from the pump 21. The ports 44 and 45 will either be inlet ports or exhaust ports depending upon the direction of rotation of the electric motor 16 and thereby the direction of rotation of the rotor 38.

A fluid conduit 47 is provided to communicate fluid from the sump 28 to port 45 when the motor 16 is operated in a direction so as to activate the spin circuit. A check valve 48 allows fluid flow only in a direction from the sump 28 into pump 21. Fluid conduit 49 is provided to communicate fluid from sump 28 to port 44 when the electric motor 16 is operated in a direction to activate the agitate circuit. Check valve 50 allows fluid flow only in a direction from the sump 28 into pump 21. Check valve 48 and 50 are spring biased open, the purpose of which will later be described.

The oscillatory agitator motor 22 includes a vane 52 mounted in a chamber 53 and has associated therewith a reversing valve 54. The vane 52 drives a shaft 51 which in turn is drivingly connected to agitator 12. Provided in the vane 52 is a slot 56 which at times communicates with a pair of ports 58, 59 and 60, 61 provided in the housing 15 adjacent the vane 52. Chamber 53 is connected to reversing valve 54 by conduits 64 and 65. Reversing valve 54 is also connected to the ports 60 and 61 by conduits 68 and 69, respectively.

The spin rotary control valve 25 and the agitator rotary control valve 23 each includes rotary valve spools 70 mounted in a bore 71 in a case section 72. Each of the rotary control valves 23 and 25 further includes a lever 73 actuatable to rotate the valve spool 70. Provided within the spool 70 of the valves 23 and 25 is a central bore 75 which is intersected by generally rectangular slots 76 provided in the valve spool 70. The control valves further each includes an inlet port 78 communicating with the bores 75 and an outlet 79 communicating with the slots 76 and the sump 28. Control valve 25 further includes an elongated bore section 80 connected to the bore 75 which has a relief piston 81 slidably mounted therein. A spring 82 is provided in the bore section 80 urging piston 81 to the right against a stop 84. Rotary valve spool 70 for valve 25 has an additional port 86 therein communicating with an exhaust port 87 provided in the case section 72.

The bypass/relief valve 24 includes a piston 90 slidable within a bore 92 in the housing 15. A valve member 91 is provided which is fixed in position in bore 92. The piston 90 has a counter-bored section 94 receiving a spring 95 which also engages the valve member 91. Valve member 91 has a central bore 97 therethrough and has a valve seat 98 formed therein engaged by a ball 99. A spring 101 urges ball 99 against seat 98 and engages a disc 102 having a central bore 103 which is mounted in the end of the bore 92. Bore 92 has a port 105 connected to the sump 28 and further has a port 106 communicating with a chamber 107 at the left end of the valve as viewed in FIG. 1. Also provided is a port 108 and a port 109 connected to a chamber 110 between piston 90 and valve member 91 and a restriction 111 is provided in the port 109. A conduit interconnects ports 106 and 109 which will later be described.

The improved brake actuator 26 includes a piston 120 which carries a collar 121. The collar 121 has an end 122 of a brake band 123 secured therein. The piston 120 is slidable in a bore 125 provided in the housing 15. The piston 120 is counter-bored at 127 to receive spring 128 which engages the end of bore 125 and urges the piston 120 to the right as viewed in FIG. 1. Pressure ports 130 and 131 are provided for the brake actuator 26.

A fluid conduit 140 interconnects the port 44 of pump 21, port 78 of valve 25, port 130 of brake actuator 26, and port 108 of bypass/relief valve 24. A fluid conduit 141 interconnects port 45 of pump 21, ports 58 and 59 of agitator motor 22, port 131 of brake actuator 26, and ports 106 and 109 of the bypass/relief valve. A branch conduit 142 is provided connecting conduit 141 to the reversing valve 54. A conduit 144 connects port 78 of the agitator control valve 23 to each end of the reversing valve 54.

The operation of the improved transmission is as follows: when the wash cycle is selected by selector valve 19, pumping element 35 of pump 21 will be rotated in a counter clockwise direction by electric motor 16. The pump will draw fluid through port 44 from the sump 28 and through the open check valve 50. Pressure thus will be supplied by the pump 21 from port 45 into conduits 141 and 47. Until the pump builds up a certain pressure the spring in check valve 48 will keep the check valve open so that the pump does not have to start rotation against a load. After pressure in conduit 47 closes check valve 48 pressure in conduit 141 will be communicated to ports 58 and 59 of agitator motor 22 and will also be supplied to the center of reversing valve 54 by conduit 142. Depending upon the position of the reversing valve 54, pressure will be supplied from conduit 142 to either conduit 64 or 65 to pressurize chamber 53 on one side of the vane 52. Fluid on the other side of the vane in chamber 53 is drained by means of the other conduit 64, 65 through reversing valve 54, conduit 144, and valve 23 to sump 28. When the vane reaches the end of its stroke, the slot 56 will interconnect, for example, pressure port 59 with port 61 to communicate pressure through conduit 69 to reversing valve 54 to change its position and pressurize the other side of the vane 52, in a manner more completely described in U.S. Pat. No. 3,373,660, issued 3/19/68, of common assignee.

The pressure in conduit 141 will also be communicated through ports 106, 109 to chambers 107, 110 of bypass/relief valve 24. In the event the pressure in conduit 141 exceeds some predetermined maximum, ball 99 will move from seat 98 to relieve the pressure. In case of rapid pressure surge, since the restriction 111 impedes flow into the chamber 110, the pressure in chamber 107 will momentarily exceed the pressure in chamber 110. Piston 90 will then move to the right to allow the surge pressure in conduit 141 to flow into port 108 and conduit 140 to return to the inlet port 44 of the pump.

During the agitate cycle of the machine the brake actuator 26 receives fluid pressure through port 131 to move the brake actuator piston 120 to the right to hold the brake band 123 expanded to engage the fixed case section 37 and thus hold the clothes basket 11 stationary. The spring 128 at the completion of the spin cycle, as will be described, moves the piston 120 to the right to expand the brake band 123 and stop the spinning of the basket as is more completely described in copending application Ser. No. 671,675, filed 9/29/67, mentioned above. However, the improved structure of the present invention utilizes the additional pressure through port 131 on piston 120 to engage the brake band with increased force to hold the clothes basket 11 stationary and thus eliminate the need for a pressure actuated positive stop pin mechanism to hold the clothes basket, as is previously known.

As described above, pressure is exhausted from reversing valve 54 into conduit 144 and port 78 into the bore 75 of rotary control valve 23. The spool 70 of valve 23 may be rotated such that an orifice of desired size is provided between the slot 76 and exhaust port 79. This orifice will control the flow of escape fluid from the unpressurized portion of chamber 53 of the agitator motor 22. Thus the speed of the agitator motor 22 can be conveniently controlled merely by adjusting the size of the orifice defined by the slot 76 and exhaust port 79 and thereby provide an infinitely variable control of the speed of agitator motor 22.

Once selector switch 19 is moved to select the spin cycle, electric motor 16 will rotate pumping element 35 of pump 21 clockwise thus drawing fluid from sump 28 through check valve 48 of conduit 47 into port 45. Pressure will be supplied then from port 44 to conduit 140 and conduit 49. As in the agitate cycle, check valve 50 will initially be open and will be closed by pressure in conduit 49 to allow the pump to begin rotation without being under load. The pressure in conduit 140 will be supplied through port 130 to act on piston 120 of brake actuator 26 to move the piston to the left against the force of spring 128 to release engagement of brake band 123 with fixed case section 37 thus releasing the clothes basket 11 for rotation.

Pressure in conduit 140 will also be supplied through port 78 to bore 75 of rotary control valve 25. In a manner similar to operation of control valve 23, spool 70 of valve 25 may be rotated to define an orifice between slot 76 and port 79 of the valve 25. Thus the output of fluid pressure from pump 21 into conduit 140 may be variably restricted. As is more fully described in previously mentioned copending application Ser. No. 671,675, since the outer element of the pump 21 is connected to basket 11, restriction of the output fluid pressure to the sump through port 79 will tend to lock up the pump 21 and cause a reaction such that the basket 11 will be rotated. The speed of rotation of the basket 11 may thus be infinitely varied by adjustment of the size of the orifice defined by slot 76 and port 79 of valve 25. If the pressure in conduit 140 exceeds some predetermined maximum, relief piston 81 will be moved against the force of spring 82 to open conduit 140 to the sump through port 87 of valve 25 to relieve excessive pressures.

As will be apparent, the rotary control valves 23 and 25 simplify previously used reciprocating valves to define an orifice size. The rotary valves 23, 25 are easily machined and provide precise control of orifice size. Further, the rotary valves can be conveniently mounted in a stationary part of the transmission to simplify the orifice control structure over that which is required when valves are installed in a rotary part in the transmission.

Referring to FIG. 4, the structural relationships of the components of the improved transmission are shown in an assembly for installation in a washing machine. A stationary case 200 including the case section 37 previously mentioned above is provided which has journalled in it at one end a drive shaft member 39 of electric motor 16 and has journalled in the other end an agitator drive shaft 51 and a hollow shaft 201 connected to drive clothes basket 11. A general numeral 15 has previously been given for the housing structure which comprises in general the rotating part of the transmission mechanism. This rotating housing 15 is connected to the hollow shaft 201 and thus to the basket 11.

Case 200 includes a case section 72 having a pilot portion 206 thereon in which drive member 39 is rotatably journalled. The control valves 23 and 25 are mounted in case section 72 of stationary case 200 on opposite sides of drive member 39 so that they may be conveniently controlled. Pilot portion 206 has rotary fluid communication with the rotating housing 15 to support the housing and to provide the necessary communication between the outlet ports of the pump 21 and the control valves 23 and 25.

As shown in FIG. 4 proceeding from left to right the housing 15 includes a section including brake actuator 26 and bypass/relief valve 24, a section containing pump 21 and a section containing agitator motor 22.

The case 200 also has an end section 208 in which shafts 51 and 201 are journalled. Case sections 37, 72 and 208 together define a fluid tight reservoir 28 and container for the transmission. Casing 200 further includes a motor section 209 containing electric motor and water pump 17.

As will be apparent from the illustrations of FIG. 4, the improved components of the present invention provide an extremely compact transmission mechanism in that the electric motor 16, water pump 17, pump 21 and agitator motor 22 are all mounted within a common housing and are coaxial. Rotary connections have been provided between the housing 15 and the stationary housing 200 so that the rotary control valves can be mounted in a stationary location and yet control operation of the parts contained in the housing 15. Further, the stationary case 200 not only provides a housing for the hydraulic transmission and its sump but also further provides a mounting for the electric motor and water pump which is isolated from the transmission and sump.

Various features of the invention have been particularly shown and described; however, it should be obvious to one skilled in the art that modifications may be made therein without departing from the scope of the invention.

We claim:

1. A fabric treating machine including a fabric container, a motor having a rotatable member, a hydraulic pump comprising a pumping element and a pump housing element which are relatively rotatable, one of said elements connected to said drive member and the other of said elements connected to said container, means including a rotary valve for selectively restricting the flow of fluid from said pump to induce rotation of said container by said pump element attached thereto whereby the rotational speed of said container is responsive to said restricting means, speed control means associated with said restricting means operative to vary the position of said restricting means thereby varying the speed of rotation of said container.

2. A fabric treating machine is claimed in claim 1 including means to bypass the flow of fluid from the outlet of said pump to the inlet of said pump until said fabric container has reached a predetermined rotational speed.

3. A fabric treating machine as claimed in claim 1 wherein said hydraulic pump is a positive displacement pump of the vane type, said pump element including a rotor and a plurality of vane members radially disposed in said rotor, said vane members remaining out of contact with said pump housing element, thereby producing a zero output pumping action until said hydraulic pump reaches a predetermined rotational speed.

4. A fabric treating machine as claimed in claim 1 wherein said motor is a reversible electric motor, operative in one direction of rotation to provide actuation of said pump and rotation of said container and including valve means operative during rotation of said motor and thereby said pump in a second direction to control a second function of said fabric treating machine.

5. A fabric treating machine as claimed in claim 1 wherein said rotary valve includes a valve spool having an internal bore, said valve spool including a rectangular port intersecting said bore and being mounted in a valve body, said body having an exhaust port, said rectangular port and said exhaust port defining a variable orifice and said valve spool being rotatable to vary the size of said orifice.

6. A hydraulic drive arrangement for a clothes cleaning machine having a clothes basket and an agitator in said basket, the drive arrangement comprising: a pump including a pumping element and a pump housing element which are relatively rotatable, one of said elements being connected to said basket, a motor having a drive member connectible to the other of said pump elements, a hydraulic motor connected to said agitator, valve means controlling operation of said hydraulic motor to actuate said agitator, rotary valve means for selectively restricting the flow of fluid from said pump to compel rotation of said pump element attached to said basket and thereby said basket whereby the rotational speed of said basket is responsive to said restricting means, speed control means associated with said restricting means operative to vary the position of said restricting means thereby varying the speed of rotation of said basket.

7. A device as claimed in claim 6 wherein said valve means controlling said hydraulic motor comprises a rotary valve.

8. A hydraulic drive arrangement for a clothes cleaning machine having a clothes basket and an agitator in said basket, said drive arrangement comprising: a pump including a pumping element and a pump housing element which are relatively rotatable, one of said elements being connected to said basket, a reversible electric motor having a drive member connectible to the other of said pumping elements, a hydraulic motor connected to said agitator, a first rotary valve means controlling operation of said hydraulic motor to actuate said agitator when said electric motor is operated in a first direction of rotation, a second rotary valve means including restricting means for selectively restricting the flow of fluid from said pump when said electric motor is operated in a second direction of rotation to include rotation of said pump element attached to said basket and thereby said basket whereby the rotational speed of said basket is responsive to said restricting means, speed control means associated with said restricting means operative to vary the position of said restricting means thereby varying the speed of rotation of said basket.

9. A hydraulic drive arrangement as claimed in claim 8 wherein said hydraulic pump is a positive displacement pump of the vane type, said pumping element including a rotor and a plurality of vane members radially disposed in said rotor, said vane members remaining out of contact with said pump housing element, thereby producing a zero output pumping action until said hydraulic pump reaches a predetermined rotational speed.

* * * * *